US009661006B2

United States Patent
Kantor et al.

(10) Patent No.: US 9,661,006 B2
(45) Date of Patent: *May 23, 2017

(54) METHOD FOR PROTECTION OF AUTOMOTIVE COMPONENTS IN INTRAVEHICLE COMMUNICATION SYSTEM

(71) Applicant: CHECK POINT SOFTWARE TECHNOLOGIES LTD., Tel Aviv (IL)

(72) Inventors: Alon Kantor, Tel Aviv (IL); Tamir Zegman, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,887

(22) Filed: Mar. 31, 2015

(65) Prior Publication Data

US 2016/0294848 A1    Oct. 6, 2016

(51) Int. Cl.
| G06F 17/00 | (2006.01) |
| H04L 29/06 | (2006.01) |
| H04L 29/08 | (2006.01) |
| G06F 21/60 | (2013.01) |
| G06F 21/55 | (2013.01) |

(52) U.S. Cl.
CPC ........ *H04L 63/1408* (2013.01); *G06F 21/554* (2013.01); *G06F 21/606* (2013.01); *H04L 63/1458* (2013.01); *H04L 63/20* (2013.01); *H04L 67/12* (2013.01)

(58) Field of Classification Search
CPC .................................................. H04L 63/1408
USPC ............................................................ 726/1
See application file for complete search history.

(56) References Cited

U.S. PATENT DOCUMENTS

| 8,955,130 B1 * | 2/2015 | Kalintsev ............. G06F 21/567 701/415 |
| 9,231,936 B1 | 1/2016 | Wang |
| 2010/0162399 A1 | 6/2010 | Sheleheda |
| 2011/0080302 A1 * | 4/2011 | Muthaiah ............... H04L 47/10 340/903 |
| 2011/0258431 A1 | 10/2011 | Gundavelli |
| 2014/0165191 A1 * | 6/2014 | Ahn .................... H04L 63/1425 726/22 |
| 2015/0089236 A1 | 3/2015 | Han |
| 2015/0113638 A1 | 4/2015 | Valasek |
| 2015/0195297 A1 | 7/2015 | Ben Noon |

(Continued)

FOREIGN PATENT DOCUMENTS

JP    WO 2014115455 A1 *    7/2014    ............. H04L 12/28

OTHER PUBLICATIONS

Schweppe et al., Security and Privacy for In-Vehicle Networks, 2012, IEEE, 978-1-4673-2682-7/12, pp. 12-17.*

*Primary Examiner* — Peter Shaw
(74) *Attorney, Agent, or Firm* — Mark M. Friedman (57) ABSTRACT

Methods and systems for mitigating cyber attacks on components of an automotive communication system are disclosed. These methods and systems comprise elements of hardware and software for receiving a frame; determining whether the frame potentially affects correct operation of an automotive component; and, taking protective action.

10 Claims, 6 Drawing Sheets

System drawing for in-vehicle protection in automotive communication system using switched ethernet (56) References Cited

U.S. PATENT DOCUMENTS

2015/0358351 A1* 12/2015 Otsuka .................... H04L 12/28
  726/23

* cited by examiner

FIG 1 System drawing for in-vehicle protection in automotive communication system using switched ethernet FIG 2. Exemplary Component Architecture of In-Vehicle Protection System FIG 3. Flow diagram for Component Access Policy Module FIG 4. Flow diagram for protocol monitor module instance FIG 5. Flow diagram for load monitor module FIG 6. Flow diagram for bit pattern detection module

METHOD FOR PROTECTION OF AUTOMOTIVE COMPONENTS IN INTRAVEHICLE COMMUNICATION SYSTEM

TECHNICAL FIELD OF THE INVENTION

The present invention relates to methods and systems for prevention of malicious or unintentional disruption of automotive components that are connected to an intra vehicular communication system.

BACKGROUND

The automotive industry is using networks to connect together devices and microcontrollers inside vehicles. These networks may utilize, for example, CANbus, Ethernet, and the like.

On such networks, some nodes can control physical components through actuators or other means, while other nodes only need to receive sensor feedback and possibly present this information to end users. Examples of nodes in such a networked automotive environment potentially include: engine control unit, battery control unit, transmission control unit, air bag control unit, in car entertainment system and the like.

This heterogeneous environment can create serious security risks. A malicious party may potentially compromise one of these components by using one of the external interfaces exposed by the vehicle. Once such a component is compromised, an attacker can use it as a stepping stone to other attack components. An attacker can thus compromise critical vehicle components such as the locking system, the braking system and the engine.

By compromising critical vehicle components, an attacker can potentially steal the car, cause serious damage to the car or its surroundings and even cause serious injury or death.

SUMMARY OF THE INVENTION

The present invention provides methods and systems for receiving a frame; determining whether the frame potentially affects correct operation of an automotive component; and taking protective action.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE INVENTION

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

The present invention may be embodied in a system, method or computer program product. Accordingly, aspects of the present invention may take the form of an entirely hardware embodiment, an entirely software embodiment (including firmware, resident software, micro-code) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Embodiments of the present invention provide for an in-vehicle protection system which is linked to a frame-switching device which receives and forwards every frame sent and received across the automotive communication network. In such an embodiment, upon encountering a suspicious frame the protection device may, for example, block frames in switching devices or raise notifications to an administrator.

However the invention may also be embodied, for example, in a passive monitoring device that is attached to the shared media bus or switched Ethernet that comprises the automotive communication network. In such an embodiment, the protection device may, for example, be unable to block frames, but may instead, for example, raise notifications to an administrator.

Alternatively, the invention may be embodied, for example, in a distributed fashion in multiple instances linked to frame-switching devices and/or passive monitors. In such an embodiment, the protection device may, for example, block frames in switching devices, and may, for example, raise notifications to an administrator from both the switching devices and passive monitors. In such embodiments, there may, for example, be information that is shared between the instances in a central data repository.

Figure 1:
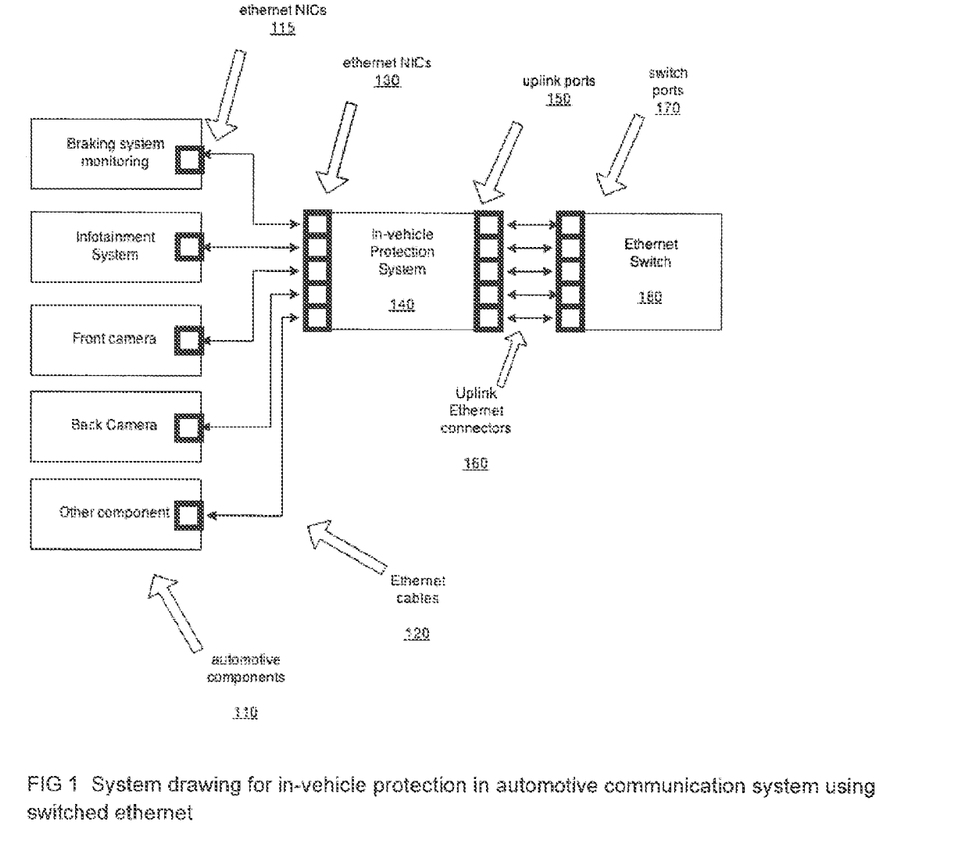
FIG. 1 is a diagram illustrating a system environment in which an embodiment of the invention is deployed in an automotive network including a frame switching device.

Reference is now made to FIG. 1, which shows an exemplary system environment including a plurality of automotive components 110 each equipped with an Ethernet Network Interface Controller (NIC) 115 linked by an Ethernet Cable 120 to a Network Interface Controller (NIC) 130 located on the in-vehicle protection appliance 140. Each NIC of the in-vehicle protection appliance 140 is, for example, linked to an Ethernet switch 180 via an Ethernet connector 160.

Alternatively, the in-vehicle protection appliance may, tar example, be collocated within an Ethernet switch, so that the uplink ports 150 and the swath ports 170 are replaced by a software interface. In this case, frames travel, for example, between the in-vehicle protection device and the switch over a software interface.

Figure 2:
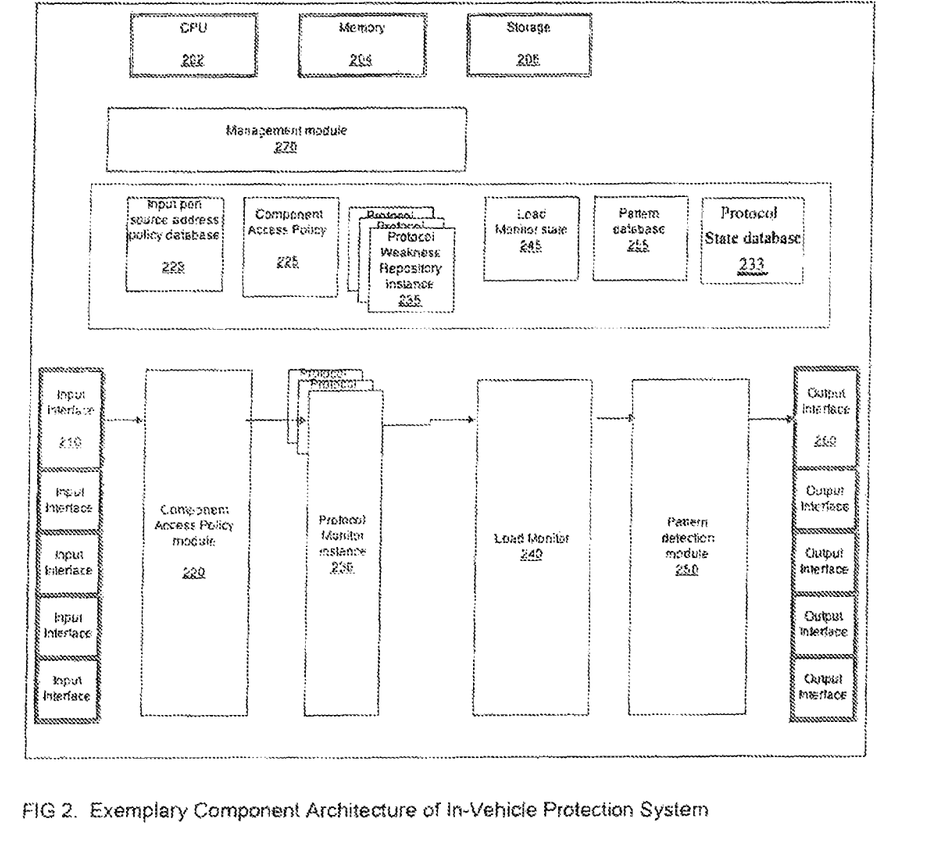
FIG. 2 is a diagram of the architecture of an exemplary in-vehicle protection appliance embodying the invention.

An exemplary internal architecture of the in-vehicle protection appliance 140 is shown in FIG. 2. The in-vehicle protection appliance 140 includes a central processing unit (CPU) 202 formed of one or more processors, electronically connected, including in electronic and/or data communication with input interfaces 210, uplink interfaces 260, access control module 220, protocol monitor modules 230, load monitor module 240, pattern matching module 250, input source address policy database 223, component access policy database 225, protocol weakness repository instances 235, load monitor configuration 245, pattern database 255, protocol state database 233 and management module 270.

A frame exemplary enters the in-vehicle protection appliance on a particular port, is processed by a series of processing modules, and transmitted on the corresponding uplink port.

Figure 3:
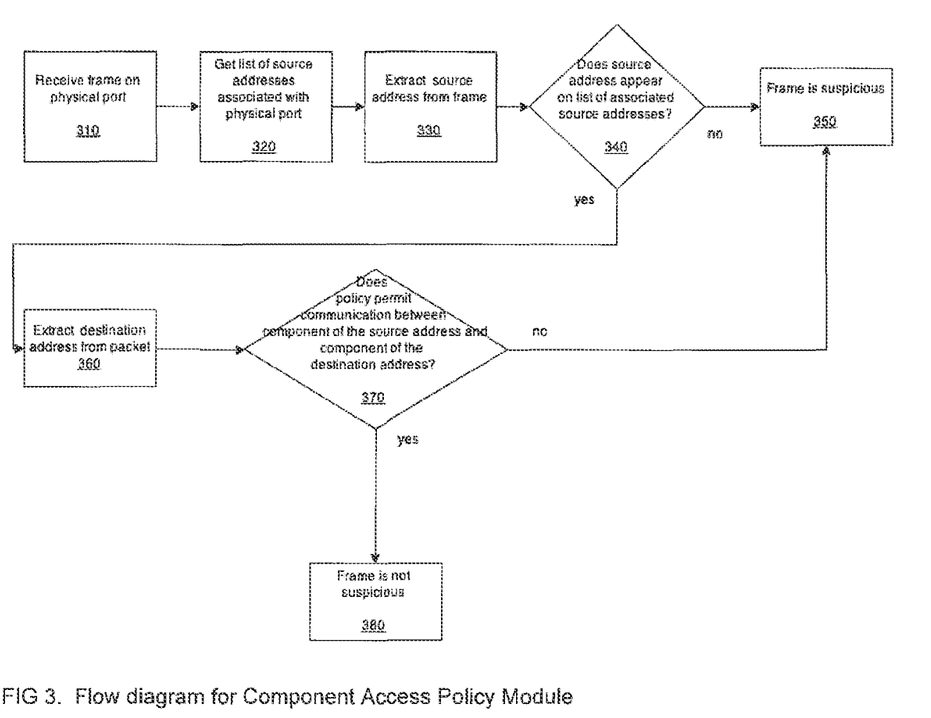
FIG. 3 is a flow diagram illustrating the process performed by the Component Access Policy Module.
Figure 4:
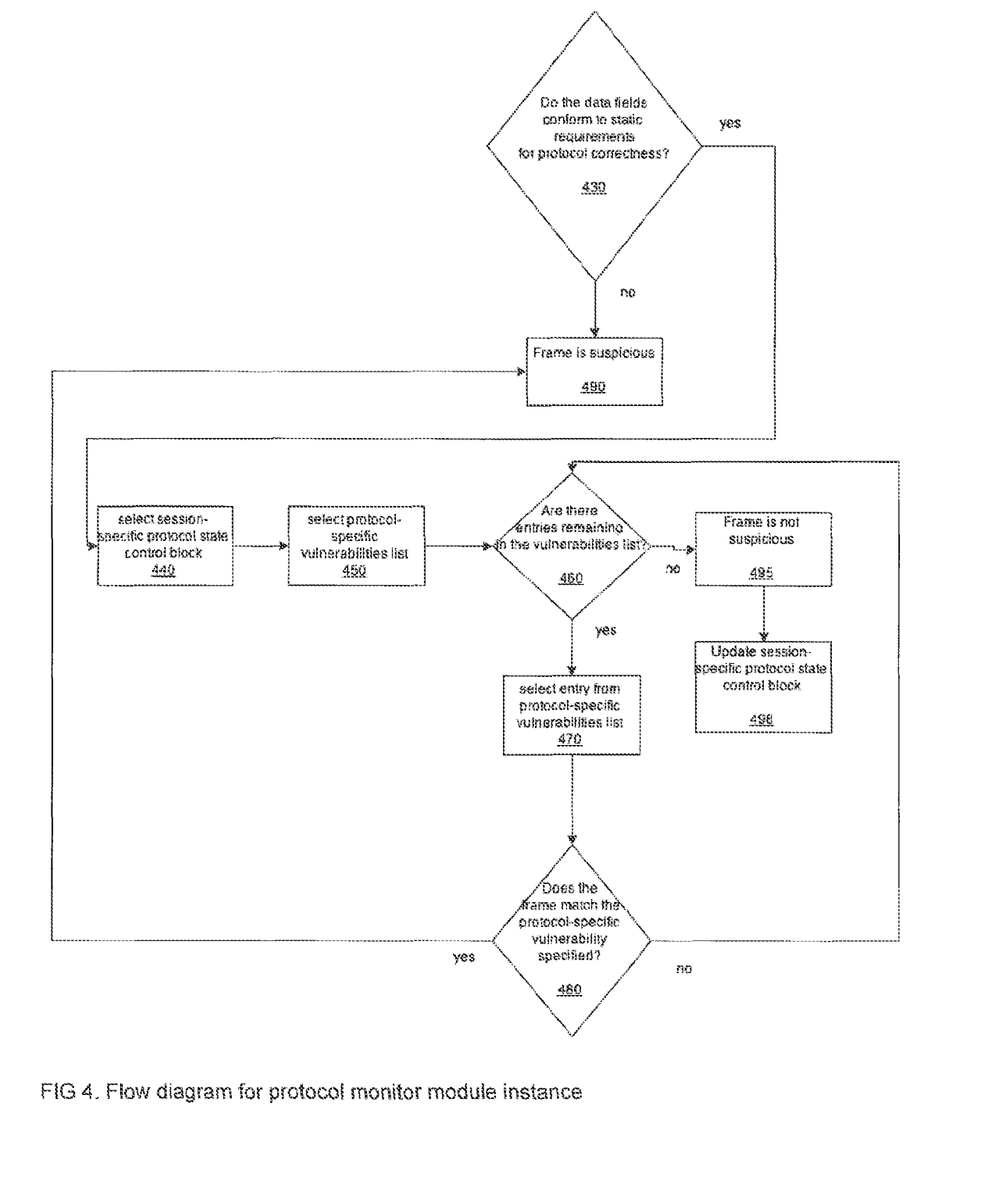
FIG. 4 is a flow diagram illustrating the process performed by a Protocol Monitor Module instance.

The Central Processing Unit (CPU) 202 is formed of one or more processors, including physical or virtual microprocessors, for performing the in-vehicle protection appliance 140 functions and operations detailed herein, including controlling the memory 204, storage 206, input interfaces 210, uplink interfaces 260, access control modules 220, protocol monitor instance modules 230, load monitor modules 240, pattern matching modules 250, input source address policy database 223, component access policy database 225, protocol weakness repository instances 235, load monitor configuration 245, pattern database 255, and management module 270 along with the processes shown in FIGS. 3 and 4. The processors are, for example, conventional processors, such as those used in servers, computers, and other computerized devices. For example, the processors may include x86 Processors from AMD and Intel, Xeon® and Pentium® processors from Intel, as well as any combinations thereof.

The memory 220 is any conventional memory media. The memory 220 stores machine executable instructions associated with the operation of the components, including, input interfaces 210, uplink interfaces 260, access control modules 220, protocol monitor instance modules 230, load monitor modules 240, pattern matching modules 250, input source address policy database 223, component access policy database 225, protocol weakness repository instances 235, load monitor configuration 245, pattern database 255, and management module 270 and all instructions for executing the processes of FIG. 4 detailed herein. The processors of the CPU 202, memory 204, and storage 206 although each shown as a single component for representative purposes, may be multiple components, and may be outside of the in-vehicle protection appliance 140, and linked to an input interface 210 or uplink interface 270.

The input interface 210 is, for example, a physical, virtual, or logical data link for communication with components in the automotive (potentially including gateways for communication beyond the automotive). Similarly, the uplink interface 260 is, for example, a physical, virtual, or logical data link for communication with, for example, an ethernet switch or, for example, another device responsible for delivering frames to an intended destination.

The Access Control Module 220 evaluates whether a received frame should be permitted ingress into the system. The module exemplary evaluates two separate criteria. First the Access Control Module 220 checks, for example, whether the originating address of the frame is known to be associated with the input port on which the frame was received. If the originating address of the frame is not known to be associated with the input port, it may be the case that a compromised node or an external attacker is attempting a cyber-attack using a forged originating address, and the incoming frame is then, for example, discarded by the Access Control Module 220.

The originating address may be, for example, an Ethernet address, an Internet Protocol (IP) address or the like. To make the determination of whether the originating address is known to be associated with the input port, the module uses, for example, the Input Port Source Address Policy database 223. The Input Port Source Address Policy database 223 is configured, for example, by the Management Module 270. Alternatively, whether a source address is associated with a particular input port may be determined by, for example, consultation with a server elsewhere on the network. Alternatively, whether a source address is associated with a particular input port may be determined by, for example, observing frame traffic for an amount of time after system initialization.

Additionally the Access Control Module 220 checks, for example, whether the automotive component originating the communication is permitted by policy to communicate with the target automotive component. For example, policy might entitle the vehicle monitoring system to communicate with the braking system, but may prohibit the infotainment system from doing so. In this case, if the infotainment system attempts to communicate with the braking system it may be an indication of a cyber attack or security compromise, and the incoming frame is then, for example, discarded by the Access Control Module 220.

The originating address and destination address of the frames may be, for example, an Ethernet address, an Internet Protocol (IP) address or the like. To make the determination of whether the originating address is permitted by policy to communicate with the destination address, the module uses, for example, the Component Access Policy database 225. The Component Access Policy database 225 is configured, for example, by the Management Module 270. Alternatively, whether a source address is permitted to send frames to a particular destination address may be determined by, for example, consultation with a server elsewhere on the network.

There are, for example, zero or more protocol monitor modules 230. Each instance of a protocol monitor module 230 is associated with, for example, a stateful or session-oriented higher-layer protocol such as Transmission Control Protocol (TCP) or Hyper Text Transfer Protocol (HTTP). The specific Protocol Monitor Module instance that is invoked corresponds to the higher-level protocol that is carried in the frame. This protocol may be, for example, Transmission Control Protocol, Session Control, Transmission Control Protocol, or the like. This protocol may also be, for example, a hierarchy of protocols such as Hyper Text Transport Protocol (HTTP) over TCP, or the like. The identification of the protocol is performed, for example, by performing deep packet inspection (DPI) on the fields of the frame.

The Protocol Monitor Module instance 230 first evaluates a received frame to determine, for example, whether the frame constitutes an attempt to disrupt the operation of the specific protocol. Subsequently, the Protocol Monitor Module instance 230 evaluates, for example, whether the frame attempts to exploit a vulnerability of the protocol implementation on a receiving node. For awareness of the protocol implementation vulnerabilities, the protocol monitor instance 230 consults, for example, the Protocol Vulnerabilities Repository instance 235 associated with the particular protocol. Additionally, the protocol monitor instance 230 updates the protocol state database 233 according to the content of the received frame. The process of the Protocol Monitor Module instance 230 is shown in detail in FIG. 4.

The Load Monitor Module 240, monitors the rate of frame arrival towards, for example, a particular destination address associated with a specific automotive component. If the frame arrival rate (calculated, for example, in frames per 10 milliseconds) exceeds, for example, a specific threshold, then the frame is deemed to comprise a cyber-attack. The frame arrival rate threshold is set, for example, by the management module 270. The Load Monitor Module 240 maintains information relating to the ongoing monitoring of frame arrivals to different destinations in the Load Monitor State database 245. The process of the Load Monitor Module 240 is shown in detail in FIG. 5.

The Pattern Matching Module 250 ensures that the frame does not contain specific bit patterns that are, for example, known to be associated with cyber-attacks. The Pattern database 255, for example, contains a list of these patterns and is configured, for example, by the management module 270. The process of the Pattern Matching Module 250 is shown in detail in FIG. 6

The Management Module 270 enables configuration of the other elements of the in-vehicle protection appliance 140. The management module 270 may, for example, provide a graphical user interface and enable configuration of the features described herein. Alternatively, the Management Module 270 may, for example, provide a programming interface to an automated management system.

The process executed by the Component Access Policy module is illustrated in FIG. 3. At block 310, the process receives a frame from, for example, a particular physical port. At block 320, the process, for example, retrieves a list of source addresses (for example Ethernet source addresses) that are, for example, known to legitimately appear on frames arriving at the port. This list is stored, for example, in the Component Access Policy database 225 and is configured, for example, by the Management Module 270.

At block 330, the source address (for example an Ethernet address) is extracted from the frame. At block 340, the process determines whether the frame's address appears in the list of source addresses known to be legitimate for receipt on the input port. If, for example, the address does not appear on the list, control moves to block 350, and the frame is treated as suspicious (triggering, for example, blocking of the frame, or notification of a suspicious event).

If the address appeared on the list of legitimate addresses, then at block 360 the destination address (for example, an Ethernet address) is extracted from the frame. At block 370, the process determines whether, for example, the component denoted by the frame source address is permitted by policy to send data to the component denoted by the frame destination address. The process accomplishes this determination by, for example, consulting a matrix located in, for example, the Component Access Policy database 225 which indicates which specific components are permitted to send data to which specific other components. This matrix in the Component Access Policy database 225 is, for example, configured by the Management Module 270 to denote which components are expected to legitimately communicate. For example, it may be the case that a vehicle's management console can legitimately access a camera, but that the braking system should not access the camera.

If the communication between components is legitimate, control moves to block 380 and the frame is not suspicious. If, however, the communication between components is not legitimate, control moves to block 350, the frame is treated as suspicious, and, for example, a protective measure ensues.

The process executed by a protocol-specific Protocol Monitor Module instance is exemplary illustrated in FIG. 4. In block 430, evaluates whether the frame conforms to the context-independent requirements of the frame's higher-level protocol. For example, a protocol monitor module for the TCP protocol may check, for example, that the flags field does not simultaneously specify two contradictory flag bits (such as SYN and FIN). If the frame does not conform to this protocol correctness check, in block 4 490 the frame is regarded as suspicious, and, for example, protective action ensues.

Next, for example, the process begins to check for discrepancies that depend on the session context. In block. 440, the process selects, for example, a control block containing session-specific state information. In the case of the TCP protocol, for example, the session may be identified by source address, destination address, source port, and destination port; and session-specific information may include, for example, current TCP sequence number and TCP receive window size. This control block resides, for example, in memory 204.

In block 450, the process selects, for example, a list of known protocol vulnerabilities for the specific protocol. The list is stored, for example, in the protocol vulnerabilities repository instance 235 and is configured by, for example, the management module 270. Each element of the list comprises, for example, a list of frame fields and associated values (possibly including masks or wildcards), as well as zero or more session state variables with associated values (possibly including masks or wildcards). Each entry in the list thus denotes, for example, a weakness in either the protocol or in the implementation of the protocol that must be mitigated.

In block 460, the process checks if there are entries remaining in the list. In block 470, the process selects the next entry from the list. In block 480, the processes evaluates whether the frame matches the vulnerability specified in the entry of the vulnerability list i.e. whether the frame fields and session control block fields match the values specified with the vulnerabilities table entry structure. If there is a match, then the frame is suspicious and, for example, protective actions are taken. If there is no match, then control returns to block 460 and the next vulnerability entry is selected. When the vulnerability entries are exhausted, then control moves to block 495 and the frame is deemed non-suspicious. In block 498, the session control structure is updated to reflect the changes to session state resulting from the new frame.

This method for identification of protocol weaknesses is an example only. Alternatively, an embodiment may, for example, hardcode the protocol weaknesses into software, so that no database is needed.

Figure 5:
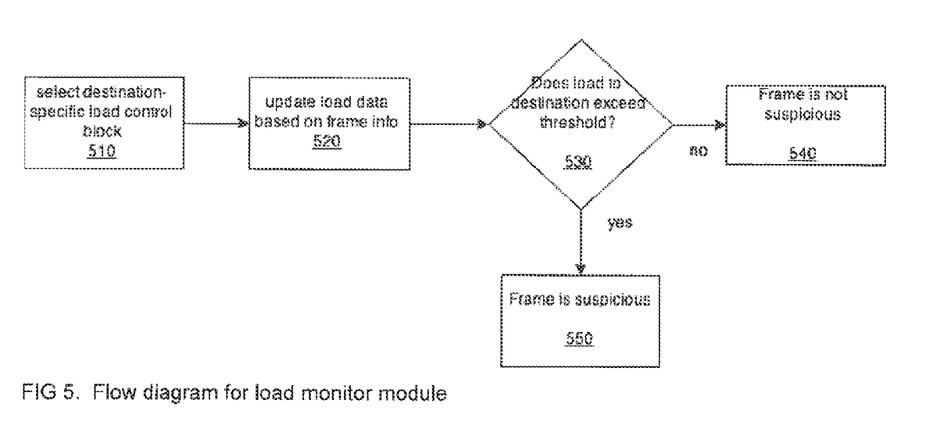
FIG. 5 is a flow diagram illustrating the process performed by a Load Monitor Module.

The process executed by the Load Monitor Module is illustrated in FIG. 5. In block 510, the process selects, for example, a destination-specific load control block. The load control block resides, for example, in memory 204, and includes information on load such as, for example, average frames per second received, average frame interarrival time, or the like.

In block 520, the process updates the information in the load control block to reflect the receipt of the latest frame. If the load, measured for example in frames-per-10-milliseconds exceeds a specific threshold, then in block 550 the frame is regarded as suspicious and, for example, protective action ensues. If the threshold is not exceeded, then control moves to block 540 and the frame is regarded as non-suspicious.

Figure 6:
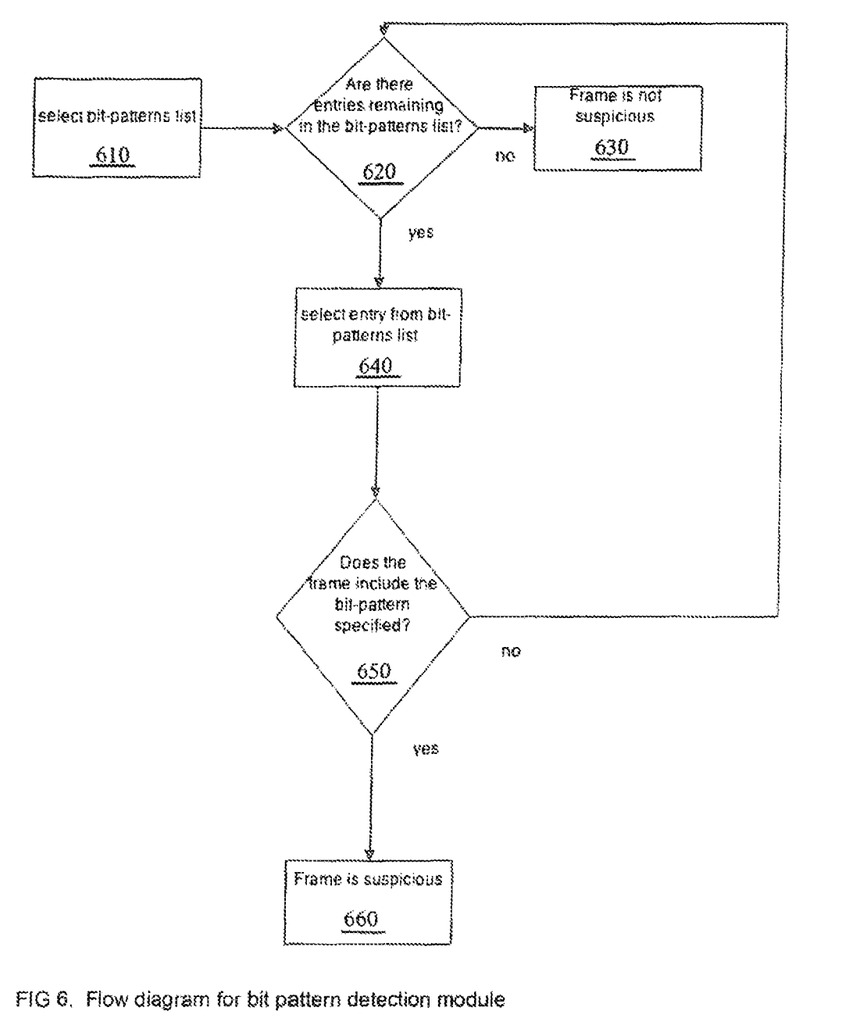
FIG. 6 is a flow diagram illustrating the process performed by Bit Pattern Detection Module.

The process executed by the Pattern Detection Module is illustrated in FIG. 6. In block 610, the process selects, for example, the most recently updated list of bit patterns that are indicative of a suspicious frame. This list resides, for example, in the Pattern Database 255. In block 620, the process checks if entries reside in the list. If so, then at block 640 the next entry is selected, and at block 650 the process searches for the bit pattern in the newly received frame. If the pattern is detected, then at block 660 the frame is regarded as suspicious and, for example, protective action ensues. If the pattern is not detected, control returns to block 620. When the list of bit patterns is completed, control moves to block 630 and the frame is not regarded as suspicious.

The invention has been described in detail for an embodiment that performs a series of processes to identify a suspicious frame and enable a protective action in response. It will be understood that an embodiment may, for example, omit one or more of these processes, or, for example, perform the processes in a different order from the order described herein. Similarly it will be understood that an embodiment may, for example, separate the processes described herein into smaller processes, or combine these subprocesses in manner different from the combinations described herein Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for mitigating cyber-attacks on automotive components in an automobile, comprising:
   receiving an unaltered data frame, on a component of an in-vehicle automotive communication system, from a first automotive component of the in-vehicle automotive communication system, the data frame being addressed to a second automotive component of the in-vehicle automotive communication system, the component and the first and second automotive components being fully retained in the automobile, and the in-vehicle automotive communication system including at least the first and second automotive components;
   analyzing a plurality of features of the data frame to determine whether the data frame affects correct operation of the second automotive component of the in-vehicle automotive communication system, wherein the analyzing of the plurality of features of the data frame includes performing in parallel each of a plurality of processes, the plurality of processes including:
      inspecting an originating address of the data frame for inconsistency with a physical ingress port of the data frame,
      checking whether the first automotive component indicated by an originating address of the data frame is prohibited by policy to communicate with the second automotive component indicated by a destination address of the data frame, inspecting data in the data frame for violation of static requirements of correctness of a higher-layer protocol associated with the data frame, inspecting data in the data frame for non-conformance to session-contextual requirements of correctness of a higher-layer protocol associated with the data frame, inspecting data in the data frame for exploitation of known weaknesses in deployed protocol stacks, measuring a rate of arrival of the data frame to determine whether a particular maximum threshold arrival rate has been exceeded, and inspecting contents of the data frame to determine whether the data frame contains a bit pattern that is characteristic of suspicious data frames; and taking protective action to prevent affecting correct operation of the second automotive component, based on the analyzing.

2. The method of claim 1, wherein the taking protective action includes blocking the data frame if the analyzing indicates the data frame as affecting correct operation of the second automotive component.

3. The method of claim 1, wherein the taking protective action includes raising an alert if the analyzing indicates the data frame as affecting correct operation of the second automotive component.

4. The method of claim 1, wherein the component of the in-vehicle automotive communication system is linked to the first and second automotive components of the in-vehicle automotive communication system via at least one Ethernet connection.

5. An in-vehicle communication system for mitigating cyber-attacks on automotive components in an automobile, comprising:

at least a first and a second automotive component;

a storage medium for storing computer components; and a computerized processor for executing the computer components comprising:

a first computer module configured for receiving an unaltered data frame from the first automotive component, the data frame being addressed to the second automotive component;

a second computer module configured for analyzing a plurality of features of the data frame to determine whether the data frame affects correct operation of the second automotive component, wherein the second computer module analyzes the plurality of features of the data frame by performing in parallel each of a plurality of processes, the plurality of processes including inspecting an originating address of the data frame for inconsistency with a physical ingress port of the data frame, checking whether the first automotive component indicated by an originating address of the data frame is prohibited by policy to communicate with the second automotive component indicated by a destination address of the data frame, inspecting data in the data frame for violation of static requirements of correctness of a higher-layer protocol associated with the data frame, inspecting data in the data frame for non-conformance to session-contextual requirements of correctness of a higher-layer protocol associated with the data frame, inspecting data in the data frame for exploitation of known weaknesses in deployed protocol stacks, measuring a rate of arrival of the data frame to determine whether a particular maximum threshold arrival rate has been exceeded, and inspecting contents of the data frame to determine whether the data frame contains a bit pattern that is characteristic of suspicious data frames; and a third computer module configured for taking protective action to prevent affecting correct operation of the second automotive component, based on the analyzing.

6. The in-vehicle communication system of claim 5, wherein the third computer module takes protective action by blocking the data frame.

7. The in-vehicle communication system of claim 5, wherein the third computer module takes protective action by raising an alert.

8. A computer-usable non-transitory storage medium having a computer program embodied thereon for causing a suitable programmed system to mitigate cyber-attacks on components in an automobile, by performing the following steps when such program is executed on the system, the steps comprising:

receiving an unaltered data frame, on a component of an in-vehicle automotive communication system, from a first automotive component of the in-vehicle automotive communication system, the data frame being addressed to a second automotive component of the in-vehicle automotive communication system, the component and the first and second automotive components being fully retained in the automobile, and the in-vehicle automotive communication system including at least the first and second automotive components;

analyzing a plurality of features of the data frame to determine whether the data frame affects correct operation of the second automotive component of the in-vehicle automotive communication system, wherein the analyzing of the plurality of features of the data frame includes performing in parallel each of a plurality of processes, the plurality of processes including:

inspecting an originating address of the data frame for inconsistency with a physical ingress port of the data frame, checking whether the first automotive component indicated by an originating address of the data frame is prohibited by policy to communicate with the second automotive component indicated by a destination address of the data frame, inspecting data in the data frame for violation of static requirements of correctness of a higher-layer protocol associated with the data frame, inspecting data in the data frame for non-conformance to session-contextual requirements of correctness of a higher-layer protocol associated with the data frame, inspecting data in the data frame for exploitation of known weaknesses in deployed protocol stacks, measuring a rate of arrival of the data frame to determine whether a particular maximum threshold arrival rate has been exceeded, and inspecting contents of the data frame to determine whether the data frame contains a bit pattern that is characteristic of suspicious data frames; and taking protective action to prevent affecting correct operation of the second automotive component, based on the analyzing.

9. The storage medium of claim 8, wherein the taking protective action includes blocking the data frame.

10. The storage medium of claim 8, wherein the taking protective action includes raising an alert.

* * * * *